B. G. Hosmer,
Reversible Latch.

Nº 41,379. Patented Jan. 26, 1864.

Witnesses:
Thomas H. Dodge
William Barritt

Inventor:
Benj. G. Hosmer

UNITED STATES PATENT OFFICE.

BENJAMIN G. HOSMER, OF NASHUA, NEW HAMPSHIRE.

IMPROVED REVERSIBLE LATCH-BOLT.

Specification forming part of Letters Patent No. 41,379, dated January 26, 1864.

*To all whom it may concern:*

Be it known that I, BENJAMIN G. HOSMER, of the city of Nashua, in the county of Hillsborough and the State of New Hampshire, have invented certain new and useful Improvements in Reversible Latch-Bolts; and I do hereby declare that the following is a full, clear, and exact description of the same, reference being had to the accompanying drawings, forming a part of this specification, and in which—

Figure 1:
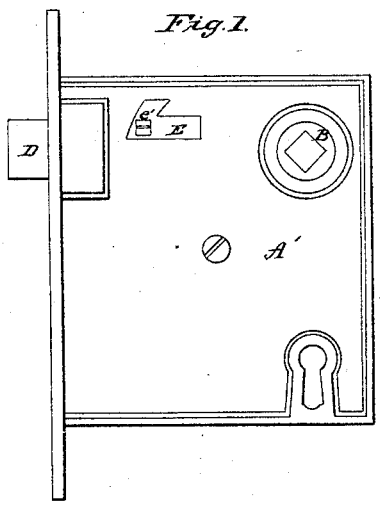
Figure 2:
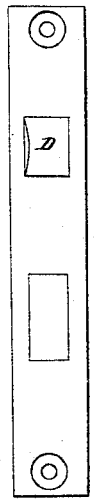
Figure 3:
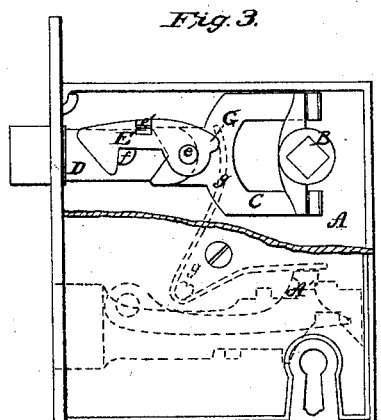
Figure 4:
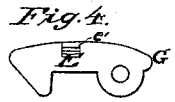
Figures 5, 6:
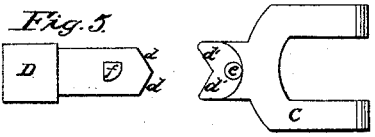

Figure 1 represents a back view of a lock with my improvements applied to the latch-bolt. Fig. 2 represents a front edge view of the same. Fig. 3 represents a back view, a part of the back plate or case being broken away in order to illustrate the nature and operation of my invention more clearly. Figs. 4, 5, 6, 7, 8, and 9 represent detached parts.

In the drawings, A represents the front case and A' the back case or plate of the lock, the same being united in the well-known manner. The lock part is shown in dotted lines, which is also of common construction.

B represents the tumbler, C the tumbler-fork, and D the latch-bolt. The front end of C is formed with two angles, d' d', between which the wedge-like end d d of the latch-bolt D fits and works. A round projection, e, is formed upon the front of the fork C, upon which the hinged hook E turns, its front hooking onto the ear or lug f on the rear of the latch-bolt D when in use, as seen in Fig. 3. Hook E is held in place by a bent spring, g, which is retained in position by a pin or lug, g', and is arranged so that said spring is made to answer a double function—that of keeping the hinged hook E in place and also the lock-bolt—as clearly indicated in full red and dotted lines, Fig. 3. The rear of hook E is formed with a projection, G, which gives a good surface for the spring g to act against, and besides prevents the latter from ever forcing itself under the rear of hook E.

Figures 7, 8:
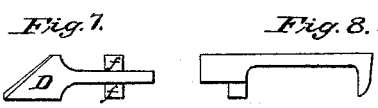
Figure 9:
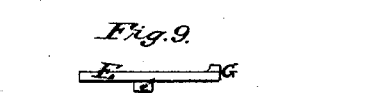

It will be seen from Fig. 7, which is an edge view of the latch-bolt, that it has an ear or lug, f, on each side, whereby the latch-bolt can be slipped in with either side next to the hook E and the connection will be alike perfect, the hook E grasping one ear or lug, f, as perfectly as the other.

By means of the peculiar form of the connection of the tumbler-fork with the latch-bolt there is but little if any rattling or wearing loose of the parts. In the event, however, of any wear of the parts, by making the hook E or the front of the ears or lugs f a little inclined or wedging, hook E will always keep the ends of C and D in close contact, since spring g, under such circumstances, would exert its force to draw said parts close together. A small projection, e', is cast or otherwise formed upon the side of hook E, whereby said hook can be moved back without removing the back plate or face, A'. (See Fig. 1.)

From the foregoing description it will be seen that any lock or latch having my invention applied thereto can be easily changed, so as to fit a right or left handed door, as the case may be, all that the operator has to do in order to make the change being to move hook E, withdraw bolt D, and slip it in the other side up and let the hook back, and the change is complete.

Having described my improvements, what I claim as my invention, and desire to secure by Letters Patent, is—

1. Connecting the latch-bolt D to the tumbler-fork C by means of the hinged or swinging hook E, substantially as and for the purposes set forth.

2. The combination of the peculiarly-constructed tumbler-fork C with the peculiarly-constructed latch-bolt D with the parts connected therewith, as and for the purposes set forth.

BENJN. G. HOSMER.

Witnesses:
THOMAS H. DODGE,
WILLIAM BARRETT.